United States Patent [19]
Kaplan et al.

[11] Patent Number: 5,872,192
[45] Date of Patent: Feb. 16, 1999

[54] THERMOSETTING POWDER-TYPE COATING COMPOSITIONS

[75] Inventors: Andreas Kaplan; René Gisler, both of Chur; Albert Reich, Trin, all of Switzerland

[73] Assignee: EMS—Inventa AG, Zurich, Switzerland

[21] Appl. No.: 909,128

[22] Filed: Aug. 11, 1997

Related U.S. Application Data

[62] Division of Ser. No. 623,856, Mar. 26, 1996.

[30] Foreign Application Priority Data

Nov. 29, 1995 [DE] Germany ........................ 195 44 512.0
Dec. 1, 1995 [DE] Germany ........................ 195 44 930.4

[51] Int. Cl.$^6$ ...................................................... C08F 16/02
[52] U.S. Cl. ......................... 525/438; 525/165; 525/170; 525/198; 525/208
[58] Field of Search ..................................... 525/438, 165, 525/170, 198, 208

[56] References Cited

U.S. PATENT DOCUMENTS 3,294,769 12/1966 Hicks .
3,781,379 12/1973 Theodore et al. .
4,042,645 8/1977 Hirota et al. .
4,346,144 8/1982 Craven .
5,266,652 11/1993 Toyoda et al. ........................ 525/327.3

OTHER PUBLICATIONS

Sandner, et al., Angew. Makromol. Chem. 181: 171–182 (1990).
Sandner, et al., Makromol. Chem. 192: 767–777 (1991).

*Primary Examiner*—Robert Dawson
*Assistant Examiner*—D. Aylward
*Attorney, Agent, or Firm*—Hill & Simpson

[57] ABSTRACT

Thermosetting powder coatings based on epoxide-containing acrylate copolymer resins are disclosed comprising:

(A) an acrylate copolymer that contains glycidyl ether residues;

(B) an aliphatic and/or cycloaliphatic polybasic acid and/or a polyol-modified anhydride of a polybasic acid and/or an amorphous or semi-crystalline carboxy-functional copolyester resin and/or a carboxy-functional acrylic resin;

(C) and, optionally, fillers and/or pigments and/or additives wherein the acrylate copolymer (A) has a molecular weight (Mw) of 1,000 to 30,000 and a glass transition temperature of 20 to 120° C. and is obtainable by, in a first step, preparing a hydroxyl-functional acrylate copolymer (D), which copolymer is then transformed into the acrylate copolymer (A), by reaction with epihaloalkanes. The aforementioned compositions can be processed further to give thermosetting powder coatings which can be applied to substrates such as metal to form protective coatings or films.

2 Claims, No Drawings

THERMOSETTING POWDER-TYPE COATING COMPOSITIONS

This is a division of application Ser. No. 08/623,856, filed Mar. 26, 1996.

FIELD OF THE INVENTION

This invention concerns powder coating compositions that are capable of being hardened or cured by means of heat, on the basis of acrylate copolymers containing epoxide groups, together with suitable curing agents and/or pigments and/or fillers and/or additives, whereby the epoxide-containing acrylate copolymer is capable of being prepared by a polymer-like reaction of hydroxyl-functional acrylate copolymers with epihaloalkanes.

BACKGROUND OF THE INVENTION

Acrylate copolymers containing epoxide groups and their use as binding agents in powder coatings are already known: See, for example, United States patents: U.S. Pat. No. 3,781,379, U.S. Pat. No. 4,042,645 and U.S. Pat. No. 4,346,144(incorporated herein by reference). As far as the hardeners are concerned, use can be made in this connection of polybasic acids or, preferably, dibasic acids, and their anhydrides or substances that form a dibasic acid under the conditions that prevail during hardening. In principle, use can also be made of other carboxy-functional compounds as hardeners such as, for example, amorphous and/or semi-crystalline polyester resins and/or acrylate resins with free carboxy groups.

The copolymers that are described in the aforementioned patents all contain glycidyl acrylate, or, as the case may be glycidyl methacrylate. The rest of the copolymer consists of other unsaturated monomers, i.e., one is dealing here with acrylate copolymers that contain glycidyl esters. The preparation of monomeric glycidyl (meth)acrylate is not simple from a technical standpoint since glycidyl (meth)acrylate readily polymerizes, and the isolation of the pure monomer is very problematical. In addition to the short storage stability of glycidyl (meth)acrylate, its high toxicity also presents problems during processing. Thus the preparation of acrylate polymers that contain glycidyl esters via the copolymerization of glycidyl (meth)acrylate is problematical and not recommended. A further disadvantage of this process is that water cannot be used as the reaction medium.

U.S. Pat. No. 3,294,769 (incorporated herein by reference) describes, in general, a process for the preparation of acrylate polymers that contain glycidyl ester groups via the reaction of carboxy-functional acrylate polymers with epichlorohydrin.

The saponification of methyl methacrylate polymers and their subsequent reaction with epichlorohydrin has been investigated by Sandner et al. (see, *Angew. Makromol. Chem.*, 181: 171–182(1990) and *Makromol. Chem.*, 192: 762–777(1991)).

SUMMARY OF THE INVENTION

It is an object of the present invention to provide thermosetting powder coating compositions comprising acrylate copolymers that contain epoxide groups, whereby the coating compositions contain special acrylate copolymers as binding agents. These compositions avoid the aforementioned disadvantages of the prior art.

This and other objects are accomplished by the coating compositions, the processes for their preparation, the methods of using such coating compositions, the processes for preparing powder coatings as well as the powder coatings themselves, which are described in the following text and in the claims.

DETAILED DESCRIPTION OF THE INVENTION

Surprisingly, it has been found that acrylate copolymers containing glycidyl ether groups can be prepared in a polymer-like reaction by reacting hydroxyl-functional acrylate copolymers with epihaloalkanes.

The subject of the invention is therefore thermosetting powder coating compositions comprising:

(A) a glycidyl ether-containing acrylate copolymer;

(B) an aliphatic and/or cycloaliphatic polybasic acid and/ or its anhydride and/or a polyol-modified anhydride of a polybasic acid and/or amorphous or semi-crystalline carboxy-functional copolyester resins and/or carboxy-functional acrylate resins;

(C) and, optionally, fillers and/or pigments and/or additives; whereby the glycidyl ether-containing acrylate copolymer has a molecular weight (Mw) of 1,000 to 30,000 and a glass transition temperature of 20° C. to 120° C. and is obtainable by, in a first step, preparing a copolymer (D) that contains hydroxyl groups, which copolymer (D) is then transformed, in further steps, into an epoxide-containing acrylate copolymer (A) via reaction with epihaloalkanes. The copolymer (D) is obtainable, in particular, via the copolymerization of a monomer mixture comprising the following components:

(a) 0 to 70 parts by weight of methyl (meth)acrylate;

(b) 0 to 60 parts by weight of (cyclo)alkyl esters of acrylic acid and/or methacrylic acid with 2 to 18 carbon atoms in the alkyl or, as the case may be, in the cycloalkyl residue;

(c) 0 to 90 parts by weight of vinyl aromatic compounds and (d) 1 to 95 parts by weight of hydroxyalkyl esters of acrylic acid and/or methacrylic acid, whereby the sum of the parts by weight of components (a) through (d) results in 100.

Hydroxyl-functional acrylate copolymers are preferred with an OH number of 10 to 400 or, preferably, from 20 to 300 [mg KOH/g].

The monomers (b) are preferably (cyclo)alkyl esters of acrylic acid or methacrylic acid with 2 to 18 carbon atoms in the (cyclo)alkyl residue. Examples of especially suitable monomers (b) re: ethyl (meth)acrylate, n-propyl (meth) acrylate, isopropyl (meth)acrylate, n-butyl (meth)-acrylate, isobutyl (meth)acrylate, tert.-butyl (meth)acrylate, 2-ethylhexyl (meth)acrylate, cyclohexyl methacrylate, neo-pentyl methacrylate, isobornyl methacrylate, 3,3,5-trimethylcyclohexyl methacrylate and stearyl methacrylate. Mixtures of the aforementioned monomers can also be used.

The monomers (c) include, for example, styrene, vinyl-toluene and α-ethylstyrene.

Suitable monomers (d) are the hydroxyalkyl esters of acrylic acid and/or methacrylic acid with 2 to 6 carbon atoms, preferably 2 to 4 carbon atoms, in the hydroxyl residue such as, for example, 2-hydroxyethyl (meth)acrylate and hydroxypropyl (meth)acrylate (i.e., the mixture of isomers that is formed during the addition of propylene oxide to (meth)acrylic acid), 4-hydroxy-n-butyl acrylate or also addition products of ε-caprolactone to the aforementioned simple hydroxyalkyl esters. Thus the term "hydroxyalkyl ester" will also encompass residues having ester groups which are produced by the addition of ε-caprolactone to simple hydroxyalkyl esters with 2 to 6 carbon atoms in the hydroxyl residue. In addition, the reaction products of glycidyl (meth)acrylate with saturated monocarboxylic acids and the reaction products of (meth)acrylic acid with saturated monoepoxides, that can also carry OH groups, can be regarded as "hydroxyalkyl esters" of (meth)acrylic acid and are therefore also suitable as monomers (d).

The preparation of the copolymers can be accomplished by copolymerization of the monomers (a) to (d) already described by conventional radical-type polymerization processes such as, for example, solution polymerization, emulsion polymerization, pearl polymerization or bulk polymerization. In this connection, the monomers are copolymerized at temperatures of 60° C. to 160° C., preferably 80° C. to 150° C., in the presence of a free radical initiator together, if necessary, with molecular weight regulators.

The preparation of the hydroxyl-functional acrylate copolymers may be carried out in inert solvents. Suitable solvents are, for example, aromatic compounds such as benzene, toluene and xylene; esters, such as ethyl acetate, butyl acetate, hexyl acetate, heptyl acetate, methylglycol acetate, ethylglycol acetate and methoxypropyl acetate; ethers, such as tetrahydrofuran, dioxane, diethylene glycol dimethyl ether; ketones, such as acetone, methyl ethyl ketone, methyl isobutyl ketone; methyl n-amyl ketone, methyl isoamyl ketone or any desired mixtures of such solvents.

The preparation of the copolymers can take place either continuously or discontinuously. Usually, the monomer mixture and the initiator are evenly and continuously metered into a polymerization reactor and the corresponding quantity of polymer is continuously drained off at the same time. Chemically virtually uniform copolymers also can advantageously be prepared in this way. Chemically virtually uniform copolymers also can be prepared by allowing the reaction mixture to run, at a constant rate, in a stirred vessel without draining off the polymerizate.

A portion of the monomers can be introduced into the vessel, for example in solvents of the type described above, and then the rest of the monomers and the auxiliary agents can be introduced, separately or together, into this mixture at the reaction temperature.

In general, polymerization takes place under atmospheric pressure; however, it can also be carried out at pressures up to 25 bars. The initiators are used in quantities of 0.05 to 15% by weight based on the total quantity of the monomers.

Suitable initiators include common radical-type initiators such as, for example, aliphatic azo compounds such as azodiisobutyro-nitrile, azo-bis-2-methylvaleronitrile, 1,1'-azo-bis-1-cyclohexanecarbonitrile and the alkyl esters of 2,2'-azo-bis-isobutyric acid; symmetrical diacyl peroxides such as, for example, acetyl peroxide, propionyl peroxide or butyryl peroxide or benzoyl peroxides that have been substituted with bromine groups, nitro groups, methyl groups or methoxy groups, and lauryl peroxide; symmetrical peroxy dicarbonates, e.g., tert.-butyl perbenzoate; hydroperoxides such as, for example, tert.-butyl hydroperoxide, cumene hydroperoxide; dialkyl peroxides such as dicumyl peroxide, tert.-butylcumyl peroxide or di-tert.-butyl peroxide.

In order to regulate the molecular weight of the copolymers, use can be made of conventional regulators during the preparation.

One may designate, by way of example, mercaptopropionic acid, tert.-dodecylmercaptan, n-dodecylmercaptan or diisopropyl-xanthogen disulfide. The regulators can be added in quantities of 0.1 to 10% by weight based on the total quantity of the monomers.

The solution of the copolymers generated during copolymerization can then be fed, without further processing, into an evaporation process or, as the case may be, a gas removal process, in which the solvent is removed, for example, in an evaporator extruder or spray dryer at approximately 120° C. to 160° C. under a vacuum of 100 to 300 mbars, and the copolymers that are to be used in accordance with the invention are recovered.

The reaction of the hydroxyl-functional copolymers (D) with epihaloalkanes to give the epoxide-containing acrylate copolymers (A) according to the invention takes place in the manner that is usual for the preparation of glycidyl ethers.

The glycidyl ethers of the hydroxyl-functional acrylate copolymers are obtained by reacting the hydroxyl-functional acrylate copolymer with epihaloalkanes. As a rule, this reaction takes place in a two-step process. In the first step, the epihaloalkane is added to the hydroxyl group of the acrylate copolymer, whereby a polyhalohydrin ether is formed. This reaction is catalyzed by Lewis acids such as, for example, boron trifluoride, tin tetrachloride, etc. Inert solvents such as, for example, benzene, toluene, chloroform, etc. are suitable as the solvent, or the reaction can take place in an excess of the epihaloalkane, which simultaneously serves as a solvent.

In the subsequent two steps, the glycidyl ether acrylate copolymer is formed by means of a dehydrohalogenation reaction in an inert solvent, for example, using an aqueous caustic alkali solution, for example aqueous sodium hydroxide solution.

Together with the water from the caustic alkali solution, the salt solution and water that are generated during this reaction form a specifically heavier aqueous waste liquor that can be separated in a simple manner from the organic layer after the reaction.

The reaction temperature in the first stage amounts to approximately 80° C. with a reaction time of approximately 30 minutes. The reaction temperature in the second stage amounts to 50° C. with a reaction time of approximately 60 minutes.

The reaction of the hydroxyl-functional acrylate copolymer can also take place in a first sequential reaction. In this case, one is dealing with a phase-transfer catalyzed two-phase reaction between the hydroxyl-functional acrylate copolymer, the epihaloalkane and an aqueous caustic alkali solution, preferably sodium hydroxide solution. Use is made in this connection of quaternary ammonium compounds and/or phosphonium compounds as the phase-transfer catalysts. For example, benzyltrimethylammonium bromide, tetramethylammonium bromide, benzyltrimethylammonium chloride, ethyltriphenylphosphonium bromide and butyltriphenylphosphonium chloride may be used; and benzyltrimethylammonium bromide is preferred.

The temperature for the reaction stage amounts to 60° C. with a reaction time of approximately 60 minutes. A variation of the phase transfer process is the so-called azeotropic process in which the water that is present and that is formed during the two-phase reaction is distilled off azeotropically under vacuum together with the epihaloalkane.

By way of example, the following may be designated as suitable epihaloalkanes: 1-chloro-2,3-epoxypropane (epichlorohydrin), 1-chloro-2-methyl-2,3-epoxypropane and 1-chloro-2,3-epoxybutane. 1-chloro-2,3-epoxypropane is preferred. Naturally, use can also be made, with success, of still further epihaloalkanes, e.g., epibromhydrin.

The acrylate copolymers (A), which contain epoxy groups, have a glass transition temperature of 20° C. to 120° C. The preferred glass transition temperature lies in the range from 30° C. to 90° C. The molecular weights (Mw) generally amount to 1,000 to 30,000 or, preferably, 1,000 to 20,000. The epoxide number of the epoxide-containing acrylate copolymer in accordance with the invention lies in the range from 0.018 to 0.510 or, especially, from 0.035 to 0.412 [equivalents/100 g].

Aliphatic polybasic acids, preferably, dibasic acids such as, for example, adipic acid, pimelic acid, suberic acid, azelaic acid, for example, adipic acid, pimelic acid, suberic acid, azelaic acid, sebacic acid, malonic aid, succinic acid, glutaric acid, 1,12-dodecanedioic acid, etc. can be used as the hardening agent—component (B). The anhydrides of these acids can also be used, e.g., glutaric anhydride, succinic anhydride as well as the polyanhydrides of these dicarboxylic acids. These polyanhydrides are obtained via the intermolecular condensation of the designated aliphatic dibasic dicarboxylic acids. Examples are the (poly) anhydride of adipic acid, the (poly)anhydride of azelaic acid, the (poly)anhydride of sebacic acid, the (poly)anhydride of dodecanedioic acid, etc. The polyanhydrides have a molecular weight (weight average, based on a polystyrene standard) of 1,000 to 5,000. The polyanhydrides can also be modified with a polyol.

The polyanhydrides can also be used as hardening agents when in admixture with the aliphatic dibasic dicarboxylic acids or when in admixture with hydroxycarboxylic acids that have melting points between 40° C. and 150° C., e.g., 12-hydroxystearic acid, 2-hydroxyoctadecanoic acid, 3-hydroxyoctadecanoic acid or 10-hydroxyoctadecanoic acid, and 2-hydroxymyristic acid.

Cycloaliphatic dicarboxylic acids such as, for example, 1,4-cyclohexanedicarboxylic acid or their polyanhydrides can also be used as hardening agents.

Suitable hardening agents are also amorphous and semi-crystalline copolyesters. Both the amorphous and the semi-crystalline copolyesters can be prepared in conformity with the condensation processes that are known for polyesters (esterification and/or trans-esterification) in accordance with the prior art. Suitable catalysts such as, for example, dibutyltin oxide or titanium tetrabutylate can also be used if required.

Suitable amorphous carboxy-functional copolyester resins have an acid number of 10 to 200 [mg KOH/g] and a glass transition temperature of >40° C. Amorphous carboxy-functional copolyesters mainly contain aromatic polybasic carboxylic acids as the acid components such as, for example, terephthalic acid, isophthalic acid, phthalic acid, pyromellitic acid, trimellitic acid, 3,6-dichlorophthalic acid, tetrachlorophthalic acid and, if available, the anhydride[s], chloride[s] or ester[s] thereof. Usually, they contain at least 50 mole-% of terephthalic acid and/or isophthalic acid or, preferably, 80 mole-%. The remainder of the acids (the difference up to 100 mole-%) consists of aliphatic and/or cycloaliphatic polybasic acids such as, for example, 1,4-cyclohexanedicarboxylic acid, tetrahydrophthalic acid, hexahydroendomethyleneterephthalic acid, hexachlorophthalic acid, azelaic acid, sebacic acid, decanedicarboxylic acid, adipic acid, dodecanedicarboxylic acid, succinic acid, maleic acid or dimeric fatty acids, hydroxycarboxylic acids and/or lactones such as, for example, 12-hydroxystearic acid, ε-caprolactone or neopentyl glycol hydroxypivalate can also be used. Use is also made, in small quantities, of monocarboxylic acids such as, for example, benzoic acid, tertiary butylbenzoic acid, hexahydrobenzoic acid and saturated aliphatic monocarboxylic acids.

As far as suitable alcohol components are concerned, one may designate the aliphatic diols such as, for example, ethylene glycol, 1,3-propanediol, 1,2-propanediol, 1,2-butanediol, 1,3-butanediol, 1,4-butanediol, 2,2-dimethylpropane-1,3-diol (neopentyl glycol), 2,5-hexanediol, 1,6-hexanediol, 2,2-[bis-(4-hydroxycyclohexyl)]propane, 1,4-dimethylolcyclohexane, diethylene glycol, dipropylene glycol and 2,2-bis-[4-(2-hydroxy)]phenyl propane. Polyols are also used in small quantities such as, for example, glycerol, hexanetriol, pentaerythritol, sorbitol, trimethylolethane, trimethylolpropane and tris(2-hydroxy)-isocyanurate. Epoxy compounds can also be used instead of diols or polyols. The proportion of neopentyl glycol and/or propylene glycol in the alcohol component preferably amounts to at least 50 mole-% based on the total acids.

Suitable semi-crystalline polyesters have an acid number of 10 to 400 [mg KOH/g] and an accurately defined DSC melting point. These semi-crystalline polyesters are the condensation products of aliphatic polyols, preferably aliphatic diols, and aliphatic and/or cycloaliphatic and/or aromatic polybasic carboxylic acids, preferably dibasic acids. By way of example, one may designate as the aliphatic polyols: ethylene glycol (1,2-ethanediol), propylene glycol (1,3-propanediol), butylene glycol (1,4-butanediol), 1,6-hexanediol, neopentyl glycol, cyclohexanedimethanol, trimethylolpropane, etc. Aliphatic diols such as, for example, ethylene glycol, butylene glycol or 1,6-hexanediol are preferred.

Suitable polybasic carboxylic acids are aliphatic dicarboxylic acids or, preferably, $C_4$-$C_{20}$ dicarboxylic acids such as, for example, adipic acid, azelaic acid, sebacic acid, dodecanedicarboxylic acid, succinic acid, undecanedicarboxylic acid and the aromatic dicarboxylic acids such as, for example, terephthalic acid, isophthalic acid, phthalic acid and their hydrogenation products such as, for example, 1,4-cyclohexanedicarboxylic acid. Aliphatic dicarboxylic acids with 6 to 12 carbon atoms are preferred. Naturally, use can also be made of mixtures of various polyols and polybasic carboxylic acids. Suitable carboxy-functional acrylate polymers have an acid number of 10 to 400 [mg KOH/g].

Mixtures of variously suitable hardeners can also be used in the thermosetting powder coating compositions.

Based on the acrylic resin, the quantity of the anhydrides and/or acids that is used as the hardening agent—component (B)—can vary over a wide range and is governed by the number of epoxide groups in the acrylate resin (A). In general, a molar ratio of carboxy groups or, as the case may be, anhydride groups to epoxide groups of 0.4–1.4:1 is selected or, preferably, 0.8–1.2:1.

In the coating system according to the invention, such conventional pigments and/or fillers and/or additives can be present as are commonly used for the preparation and use of powder coatings. These include additives from the group of accelerators, flow-promoting agents and degassing agents, heat stabilizers, UV stabilizers, and/or HALS stabilizers and/or tribo-additives as well as matting agents if required such as, for example, waxes.

The preparation of the powder coatings in accordance with the invention preferably takes place in the melt as a result of the communal extrusion of all the formulation components at temperatures between 60° C. and 140° C. The extruded material is then cooled, ground and selectively sieved to a grain size that is smaller than 90 μm. Alternatively, other processes for the preparation of the powder coatings are also suitable such as, for example, mixing together the formulation components in solution, with subsequent precipitation or removal of the solvent by distillation.

The application of the powder coatings in accordance with the invention is carried out by any process commonly used for such purposes such as, for example, by means of electrostatic spraying devices (corona or tribo) or using a fluidized bed process.

Powder coatings prepared as described herein may be applied to substrates such as metal and baked for, e.g., 5–60 minutes at 160° C. to 220° C. to form a hard thermoset protective finish which is thermally stable and resistant to solvents, and which has good metal adhesion properties, good mechanical strength and high durability, e.g., against weathering.

The preparation and the properties of thermosetting powder coating compositions in accordance with the invention are illustrated below by the following examples.

Preparation of Hydroxyl-functional Acrylate Copolymers

EXAMPLES 1 and 2

General procedure

Part I (see Table 1) is introduced into a stainless steel reactor equipped with a stirring device, a cooling device and a heating device together with electronic temperature control. Part I is heated under nitrogen up to the point of refluxing. Part II and Part III (see Table 1) are then slowly added in parallel over a period of 3 hours, during the course of which the reaction mixture is boiled under reflux. After addition of Part II and Part III has been terminated, the reaction mixture is boiled for a further 2 hours under reflux. The solvent is then removed from the reaction mixture under vacuum.

TABLE 1

Acrylate Copolymers Containing Hydroxyl Groups (weights are in g)

|  | Example 1 | Example 2 |
|---|---|---|
| Resin No. | I | II |
| Part I |  |  |
| xylene | 1,000.00 | 1,000.00 |
| Part II |  |  |
| ditertiary-butyl peroxide | 46.25 | 46.25 |
| xylene | 78.75 | 78.75 |
| Part III |  |  |
| hydroxyethyl methacrylate | 537.43 | 429.89 |
| n-butyl acrylate | 185.00 | 185.00 |
| methyl methacrylate | 780.70 | 888.23 |
| styrene | 809.38 | 809.38 |
| mercaptopropionic acid | 57.90 | 57.90 |

TABLE 2

Properties of Resins I and II

|  | Example 1 | Example 2 |
|---|---|---|
| Resin No. | I | II |
| OH number [mg KOH/g] | 98.0 | 78.0 |
| Tg [°C.] (calculated) | 71 | 73 |
| Molecular weight (Mw) | 7,900 | 7,800 |

Preparation of Epoxide-containing Acrylate Copolymers of the Invention

EXAMPLE 3

560 g of resin No. I were dissolved in 2,000 g of toluene in a 20 liter reactor that is capable of being heated and that has been equipped with a thermometer, a stirrer and a reflux column. After the addition of 18 ml of boron trifluoride ethyl etherate, the temperature was increased to 80° C. and 100 g of epichlorohydrin were added dropwise over a period of one hour. After this, stirring was continued for 30 minutes at 80° C. and then the mixture was cooled to 50° C. After the addition of 200 g of aqueous caustic soda (22%), the mixture was stirred for a further hour at 50° C. After this, the aqueous phase was separated. Resin No. III was obtained (properties: see Table 3) after vacuum distillation of the organic phase at a temperature of 130° C. under reduced pressure (1 mm Hg).

EXAMPLE 4

560 g of resin No. I were dissolved in 2,000 9 of toluene and 1,000 g of epichlorohydrin at 60° C. in a 20 liter reactor that is capable of being heated and that has been provided with a thermometer, a stirrer and a reflux column. After the addition of 18.6 g of benzyltrimethylammonium chloride, 200 g of aqueous caustic soda (22%) were added and the mixture stirred for one hour at 60° C. After this, the aqueous phase was separated. Resin No. IV was obtained (properties: see Table 3) after vacuum distillation of the organic phase at a temperature of 130° C. under reduced pressure (1 mm Hg).

EXAMPLE 5

700 g of resin No. II were dissolved in 2,000 g of toluene in a 20 liter reactor that is capable of being heated and that has been provided with a thermometer, a stirrer and a reflux column. After the addition of 18 ml of boron trifluoride ethyl etherate, the temperature was increased to 80° C. and 100 g of epichlorohydrin were added dropwise over a period of one hour. After this, stirring was continued for 30 minutes at 80° C. and then the mixture was cooled to 50° C. After the addition of 200 g of aqueous caustic soda (22%), the mixture was stirred for a further hour at 50° C. After this, the aqueous phase was separated. Resin No. V was obtained (properties: see Table 3) after vacuum distillation of the organic phase at a temperature of 130° C. under reduced pressure (1 mm Hg).

EXAMPLE 6

700 g of resin No. II were dissolved in 2,000 g of toluene and 1,000 g of epichlorohydrin at 60° C. in a 20 liter reactor that is capable of being heated and that has been provided with a thermometer, a stirrer and a reflux column. After the addition of 18.6 g of benzyltrimethylammonium chloride, 200 g of aqueous caustic soda (22%) were added and the mixture stirred for one hour at 60° C. After this, the aqueous phase was separated. Resin No. VI was obtained (properties: see Table 3) after vacuum distillation of the organic phase at a temperature of 130° C. under reduced pressure (1 mm Hg).

TABLE 3

Properties of Resins III to VI

|  | Example 3 | Example 4 | Example 5 | Example 6 |
|---|---|---|---|---|
| Resin No. | III | IV | V | VI |
| Initial resin | I | I | II | II |
| E Number [equiv./100 g] | 0.145 | 0.146 | 0.117 | 0.118 |
| Tg [°C.] (calculated) | 69 | 70 | 70 | 71 |
| Molecular weight (Mw) | 7,900 | 7,900 | 7,800 | 7,800 |

Preparation of Powder Coatings

EXAMPLES 7 AND 8

840 parts by weight of Resin III (example 7) or Resin IV (example 8), 150 parts by weight of dodecanedicarboxylic acid, 5 parts by weight of Resiflow® PV 88 and 5 parts by weight of benzoin were mixed for 30 seconds in the dry state in a Henschel mixer at 700 RPM and then extruded in a Buss-Co-Kneader (PLK 46) extruder using a jacket temperature of 100° C., a cooled screw conveyor and a rate of rotation of the screw of 150 RPM. The extruded material was cooled, ground and selectively sieved to less than 90 μm.

The powder coatings were applied electrostatically to aluminum sheets (Q panel AL-36 5005 H 14/08 (0.8 mm)) and cured at a temperature of 200° C. using a curing time of 15 minutes.

Table 4 shows the technical properties of the resultant lacquers.

EXAMPLES 9 AND 10

870 parts by weight of Resin V (example 9) or Resin VI (example 10), 120 parts by weight of dodecanedicarboxylic acid, 5 parts by weight of Resiflow® PV 88 and 5 parts by weight of benzoin were mixed for 30 seconds in the dry state in a Henschel mixer at 700 RPM and then extruded in a Buss-Co-Kneader (PLK 46) extruder using a jacket temperature of 100° C., a cooled screw conveyor and a rate of rotation of the screw of 150 RPM. The extruded material was cooled, ground and selectively sieved to less than 90 μm.

The powder coatings were applied electrostatically to aluminum sheets (Q panel. AL-36 5005 H 14/08 (0.8 mm)) and cured at a temperature of 200° C. using a curing time of 15 minutes.

Table 4 shows the technical properties of the resultant lacquers.

TABLE 4

|  | Example 7 | Example 8 | Example 9 | Example 10 |
| --- | --- | --- | --- | --- |
| Resin basis | III | IV | V | VI |
| Gelation time Kofler rack 200° C. | 30 | 31 | 27 | 28 |
| Gloss (60° DIN 67530) | 109 | 108 | 108 | 109 |
| Flow properties | very good | very good | very good | very good |
| Erichsen penetration (DIN 53156) (mm) | 9.9 | 9.8 | 9.8 | 9.9 |
| Cross cut (DIN 52151) | 0 | 0 | 0 | 0 |
| Impact (ASTM D 2794, back side) | 30 | 40 | 30 | 20 |

We claim:

1. A method for making a thermosetting powder coating composition, said method comprising the steps of:

(A) preparing an acrylate copolymer containing ether bound epoxy groups having a molecular weight of from about 1000 to about 30,000 and a glass transition temperature of from about 20° C. to about 120° C. by reacting a hydroxyl-functional acrylate copolymer with an epihalohydrin;

(B) coextruding at a temperature of between about 60° C. and 140° C. the acrylate copolymer containing ether bound epoxy groups prepared in step (A) with (1) an aliphatic and/or cycloaliphatic polybasic acid and/or a polyol-modified anhydride of a polybasic acid and/or an amorphous or semi-crystalline carboxy-functional copolyester resin and/or a carboxy-functional acrylic resin, and (2) optionally, fillers and/or pigments and/or additives;

(C) cooling the extrudate; and (D) thereafter, grinding the cooled extrudate to a grain size of less than about 90 μm to provide said thermosetting powder coating composition.

2. A method as defined in claim 1, wherein said additives are selected from the group consisting of: accelerators, flow promoting agents, degassing agents, heat stabilizers, UV stabilizers, HALS stabilizers, tribo-additives, matting agents and mixtures of any of the foregoing additives.

* * * * *